(12) United States Patent
Marcantoni

(10) Patent No.: US 11,279,511 B2
(45) Date of Patent: Mar. 22, 2022

(54) MACHINE FOR TREATING OR CONVEYING CONTAINERS

(71) Applicant: MAKRO LABELLING S.R.L., Mantova (IT)

(72) Inventor: Simone Marcantoni, Mantova (IT)

(73) Assignee: MAKRO LABELLING S.R.L., Mantova (IT)

( * ) Notice: Subject to any disclaimer, the term of this patent is extended or adjusted under 35 U.S.C. 154(b) by 0 days.

(21) Appl. No.: 16/970,768

(22) PCT Filed: Feb. 15, 2019

(86) PCT No.: PCT/IB2019/051229
§ 371 (c)(1),
(2) Date: Aug. 18, 2020

(87) PCT Pub. No.: WO2019/159116
PCT Pub. Date: Aug. 22, 2019

(65) Prior Publication Data
US 2021/0086938 A1    Mar. 25, 2021

(30) Foreign Application Priority Data
Feb. 19, 2018  (IT) .......................... 102018000002805

(51) Int. Cl.
*B65G 54/02* (2006.01)
*B65C 9/04* (2006.01)
(Continued)

(52) U.S. Cl.
CPC ................ *B65C 9/04* (2013.01); *B65G 54/02* (2013.01); *B65C 9/06* (2013.01); *B65C 9/40* (2013.01);
(Continued)

(58) Field of Classification Search
CPC ........ B65G 47/84; B65G 29/00; B65G 54/02; B65C 9/02
(Continued)

(56) References Cited

U.S. PATENT DOCUMENTS 4,893,707 A * 1/1990 Langen .................. B65G 17/26
                                                                        198/626.3
6,321,896 B1 * 11/2001 Zuccheri .............. B65G 47/082
                                                                        198/419.1
(Continued)

FOREIGN PATENT DOCUMENTS

EP         2743192      6/2014
WO      2015036159      3/2015

*Primary Examiner* — Douglas A Hess
(74) *Attorney, Agent, or Firm* — Workman Nydegger

(57) ABSTRACT

A machine for treating or conveying containers, comprising a guide extending along a feed direction for feeding the containers and a plurality of carriages for supporting the containers slidably mounted on a same guide consecutively to each other; said guide and each carriage together defining respective linear motors. Each support carriage comprises at least a part of respective gripping means and, in particular, two gripping means respectively mounted on different and consecutive carriages along the same guide. The carriages are movable towards or away from each other so as to regulate the reciprocal distance along the feed direction for feeding the containers and define a picking area of the gripping means between them as a function of the type of container to be picked or released.

17 Claims, 3 Drawing Sheets

(51) Int. Cl.
  *B65C 9/06* (2006.01)
  *B65C 9/40* (2006.01)
  *B65G 47/86* (2006.01)

(52) U.S. Cl.
  CPC .... *B65G 47/842* (2013.01); *B65G 2201/0244* (2013.01); *B65G 2811/0615* (2013.01)

(58) Field of Classification Search
  USPC .................. 198/470.1, 473.1, 474.1, 619
  See application file for complete search history.

(56) References Cited

U.S. PATENT DOCUMENTS

| | | | | |
|---|---|---|---|---|
| 6,799,410 | B2 * | 10/2004 | Gamberini | B65B 59/001 |
| | | | | 53/233 |
| 8,096,409 | B2 * | 1/2012 | Wipf | B65G 47/28 |
| | | | | 198/805 |
| 8,602,471 | B2 * | 12/2013 | Bodtlander | B65G 47/847 |
| | | | | 294/192 |
| 8,776,985 | B2 * | 7/2014 | Huettner | B65G 54/02 |
| | | | | 198/459.8 |
| 9,061,838 | B2 * | 6/2015 | van de Loecht | B65G 47/31 |
| 9,079,724 | B2 * | 7/2015 | van de Loecht | B65G 47/841 |
| 9,346,576 | B2 * | 5/2016 | Allgaier | B65B 43/52 |
| 9,403,611 | B2 * | 8/2016 | Sacchetti | B65G 47/082 |
| 9,731,912 | B2 * | 8/2017 | Fahldieck | B65G 47/847 |
| 9,809,392 | B2 * | 11/2017 | Walter | B65G 54/02 |
| 9,873,571 | B2 * | 1/2018 | Hahn | B65G 47/846 |
| 9,995,691 | B2 * | 6/2018 | Piana | B65G 23/23 |
| 10,968,048 | B2 * | 4/2021 | Niehr | B65G 47/907 |

* cited by examiner

MACHINE FOR TREATING OR CONVEYING CONTAINERS

TECHNICAL FIELD

The present invention relates to a machine for treating or conveying containers and, in particular, a conveyor for conveying the containers of such treatment machine.

The present invention relates to the sector of work machines for containers suitable for moving for example a bottle along a predefined feed direction and for carrying out, during the movement, a plurality of automatic operations thereon (e.g. labelling, filling, capping, . . . ) by means of predefined units connected to the machine along such feed direction.

TECHNICAL FIELD

Machines for treating or conveying containers currently use two alternative types of conveyor: a conveyor with a rotating carousel or a conveyor with a linear motor.

The latter type of conveyor envisages the use of a guide that acts as a stator and carriages slidably mounted on the guide that act as a rotor. In detail, the stator is formed by a plurality of adjacent windings, while the rotor comprises permanent magnets mounted on one or more carriages for moving them along the feed direction.

Furthermore, such type of conveyor also comprises a drive, preferably mounted on board the motor (but it could also be distanced) connected to the windings for driving the electrical current that flows therein so as to generate an electromagnetic field that moves linearly and that is followed by the related carriage.

A control unit is also present (usually distanced from the machine) and connected to the drive for controlling the latter as a function of the requirements of the operation to be performed on the containers set by an operator or by a computer. Alternatively, the control unit and the drive could be made in a single controller.

In any case, each container is loaded onto a respective carriage that moves it along a predefined path passing through one or more treatment stations (e.g. labelling).

An example of such prior art is described in document WO2017/103813 filed in the name of the Applicant.

In accordance with such prior art, the path along which the guide extends is usually flat and annular in which there are two straight lines that define a outward stretch and a return stretch connected together by two curved stretches.

In some embodiments of the prior art, there are two guides, an upper one and a lower one, which extend on overlapping horizontal planes. In detail, the carriages mounted on the lower guide comprise plates for supporting the containers, and the carriages mounted on the upper guide comprise jacks for keeping the containers pressed against the respective underlying plates. The carriages arranged above and below the same container move in synchrony so as to transport it along the path.

However, this technology implies some drawbacks.

In particular, for conveying containers, it is envisaged that they are loaded onto lower carriages and possibly retained by the upper jacks so as to be able, for example, to perform labelling on the side of the container. However, it often happens that for some types of containers (e.g. low jars) it is necessary to print on the top and on the base of the container.

According to the current prior art, this is not possible as the upper and lower surfaces are occupied by the dimensions of the plate and of the upper jack.

OBJECTS OF THE PRESENT INVENTION

In this situation, the object of the present invention is to realise a machine for treating or conveying containers which obviates the above-cited drawbacks.

It is a particular object of the present invention to realise a machine for treating or conveying containers of the linear motor type that allows the container to be conveyed leaving the top and/or base of the container free for treatment.

The above-indicated objects are substantially attained by a machine for treating or conveying containers according to what is described in the appended claims.

BRIEF DESCRIPTION OF THE FIGURES

Further characteristics and the advantages of the present invention will appear more clearly from the detailed description of some preferred, but not exclusive, embodiments of a machine for treating containers illustrated in the appended drawings, wherein.

Figure 1:
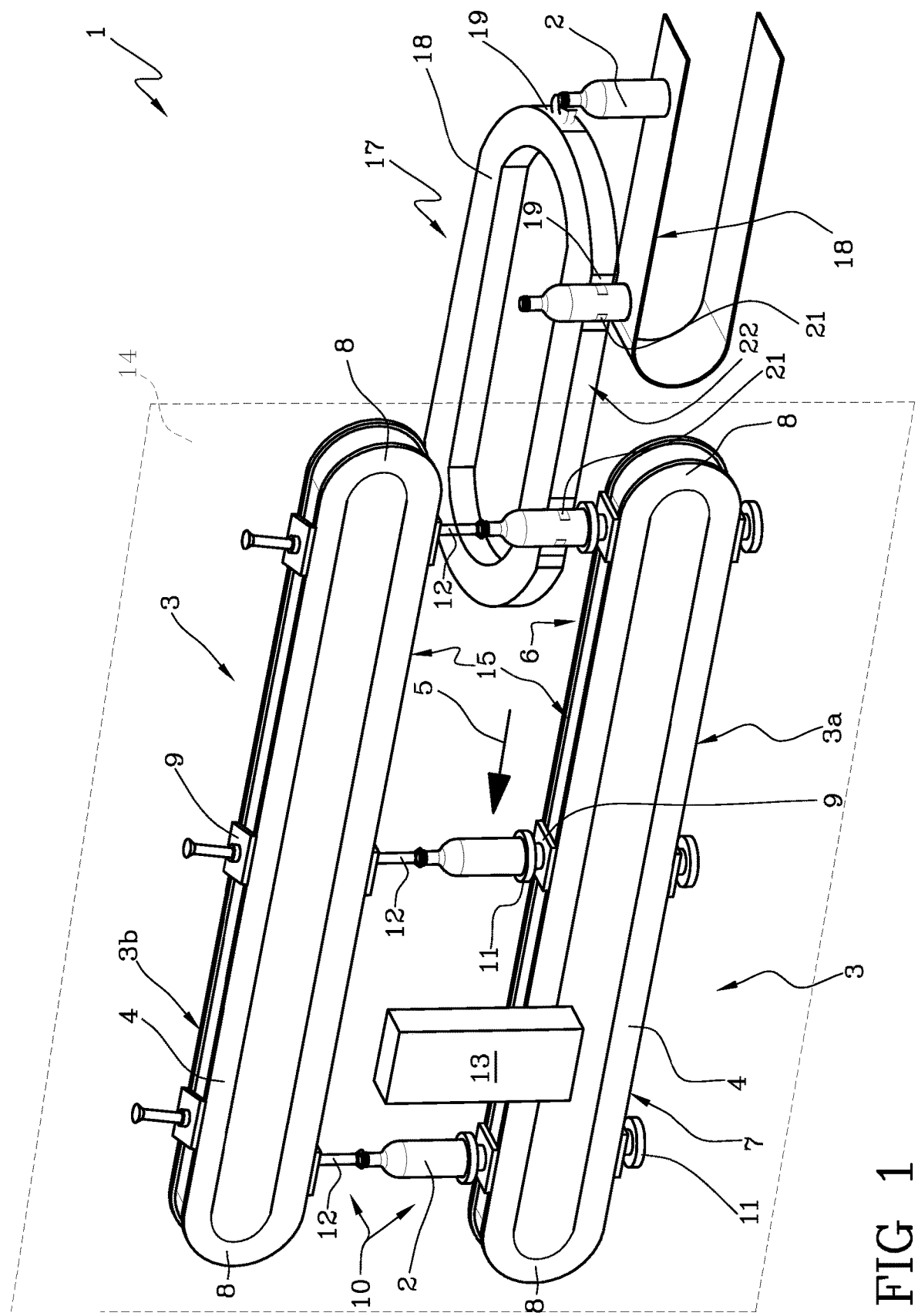
FIG. 1 shows a lateral schematic view of a first embodiment of a machine for treating containers comprising a conveyor according to the present invention.

DETAILED DESCRIPTION OF AT LEAST ONE PREFERRED EMBODIMENT OF THE PRESENT INVENTION

With reference to the cited figures, reference numeral 1 denotes in its entirety a machine for treating containers 2 according to the present invention.

In general, the present invention relates to a machine 1 for treating containers 2 comprising at least one conveyor 3 for said containers 2. Such conveyor 3 is of the linear motor type and comprises a guide 4 extending along a feed direction 5 for feeding containers 2 wherein said guide 4 has a substantially annular shape and defines an outward stretch 6 and a return stretch 7. The outward stretch 6 and the return stretch 7 are connected by respective curvilinear stretches 8 that are part of the guide 4 itself. In any case, the guide 4 could have other shapes not expressly identified herein.

Furthermore, the conveyor 3 comprises a plurality of carriages 9 for supporting the containers 2 slidably mounted on the guide 4 consecutively to each other. In this way, the guide 4 and each carriage 9 define together respective linear motors of the type that can be controlled independently of each other. In particular, the guide 4 defines the stator of the linear motor, while the carriages 9 define respective rotors of the linear motor.

Advantageously, the position, speed and acceleration of each support carriage 9 can be controlled independently from the other carriages 9 so as to transport the bottles as a function of individual needs.

On this point, the conveyor 3 comprises a control unit configured to regulate the intensity of the current and the power supplied in the electrical windings of the guide 4 as a function of the position, speed and acceleration that are to be applied to the carriage 9.

In other words, the linear motor comprises a plurality of electrical windings consecutively arranged along the guide 4 in which the electrical current is supplied that generates the electromagnetic field for the attraction of the carriage 9.

The term "control unit" generally indicates both an electrical drive of the windings of the stator (preferably mounted on board the linear motor) and a controller that commands such drive (preferably distanced from the motor) connected to the drive for forwarding the imparted commands to the latter.

Furthermore, each support carriage 9 comprises a respective means 10 for supporting and/or retaining a respective container 2 wherein said support and/or retaining means 10 is configured to interact individually with a respective container 2 to be treated independently from the support means of other support carriages 9 so as to transport each container 2 independently from the other containers 2.

It is to be noted that the support and/or retaining means 10 comprises a rotating plate 11 arranged below the container 2 onto which the container 2 itself is loaded. In that case, such means is of the support type (the guide 4 is arranged below the containers 2).

Furthermore or alternatively, said support and/or retaining means 10 may comprise a pressing member 12 (usually a jack) arranged above the container 2 and configured to exert a pressure on the top of the container 2 itself towards a vertical direction. In that case, such means is of the retaining type (the guide 4 is arranged above the containers 2).

Furthermore, the machine 1 comprises at least one treatment unit 13 for treating the containers 2 arranged along said guide 4 (preferably flanked to the guide 4). Such treatment unit 13 for treating the containers 2 is preferably a labelling unit, but it could be defined by other types of treatment unit 13 not expressly mentioned herein.

As already mentioned, the machine 1 comprises a control unit operatively connected to the guide 4, to the carriages 9, to the treatment unit 13 and to said rotating plate 11. The control unit is configured to control the position of the carriage 9 along the guide 4 and to activate the rotation of the rotating plate 11 before the carriage 9 reaches the treatment unit 13 so as to orient the container 2 before the treatment unit 13.

In particular, the machine 1 comprises a detection means (not shown in the appended figures) for detecting the initial orientation of the container 2 loaded onto a carriage 9, which is arranged upstream of the treatment unit 13 and is configured to generate a signal for detecting the initial orientation of the container 2 and for sending it to the control unit. The control unit is configured to receive said detection signal and to activate the rotation of the rotating plate 11 as a function of a final orientation position to be reached.

In other words, the control unit is configured to:
Receive the detection signal that represents the conformation of the outer surface of the container 2;
Analyse the contents of said detection signal to identify a predefined reference position on the container 2 (e.g. application position of the label);
Command the rotating plate 11 to rotate the container 2 loaded onto it for bringing it into the angular position for the application of the label with respect to the treatment unit 13.

In particular, the orientation takes place before the container 2 reaches the treatment unit 13. Preferably, the detection means comprises a follower on which a detector is mounted wherein said follower is configured to follow a container 2 in the feed direction for a predefined stretch so as to exploit the space necessary for detecting the container 2 in rotation.

It is to be noted that each carriage 9 comprises a means for moving the rotating plate 11. Such movement means may be an electric motor and/or a mechanical member that takes the movement from the displacement of the carriage 9 itself along the guide 4 and/or a mechanical member that takes the movement from outside.

Figure 2:
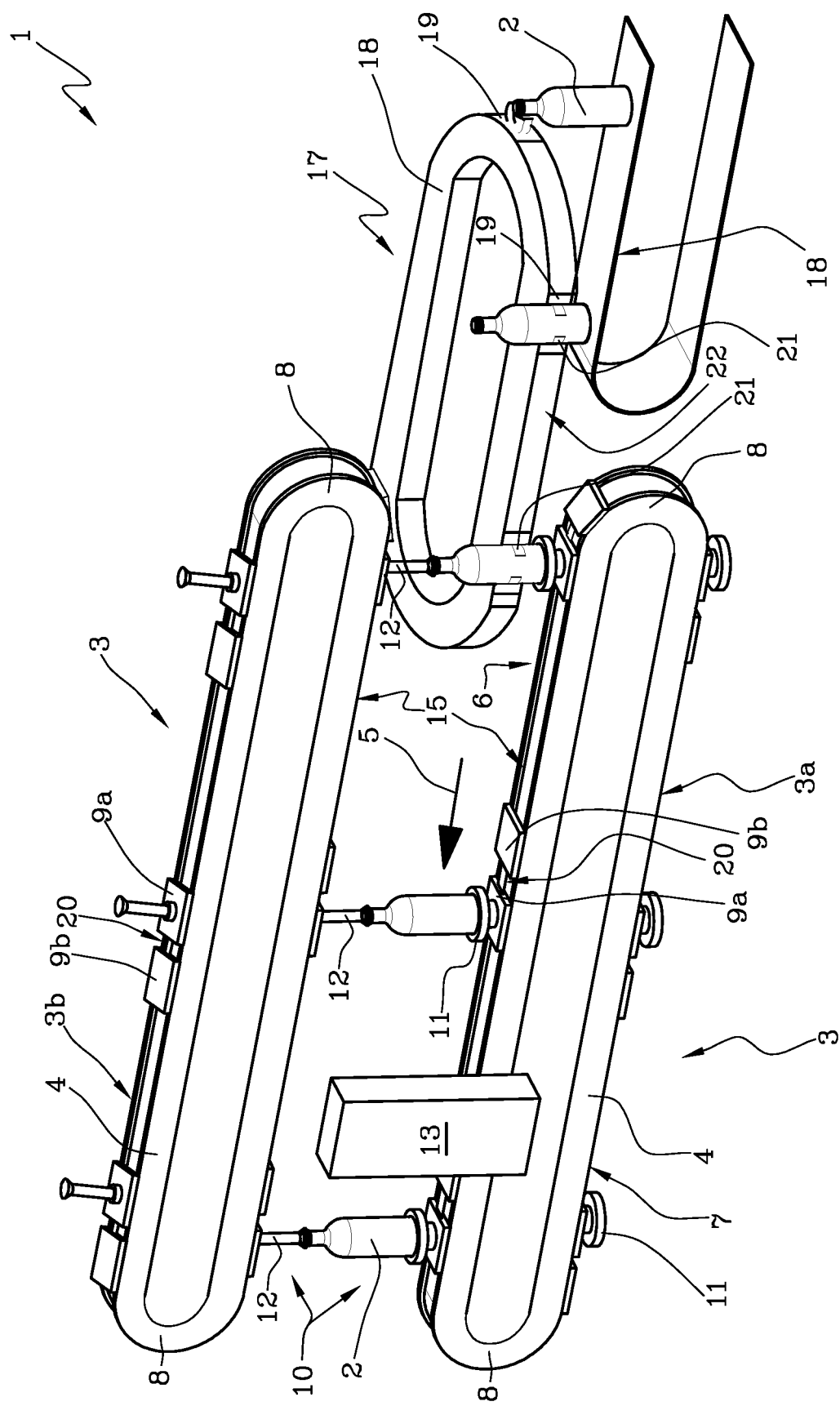
FIG. 2 shows a lateral schematic view of a second embodiment of the machine for treating containers comprising a conveyor according to the present invention.

In an alternative embodiment of the present invention illustrated in FIG. 2, the means for moving the rotating plate 11 comprises auxiliary carriages 9b mounted slidably on the guide 4 and respectively associated with the support carriages 9a, now defined as "main 9a".

The main carriage 9a and the auxiliary carriage 9b, both associated to the guide 4, respectively define a main linear motor and an auxiliary linear motor. In other words, the two carriages 9 (main and auxiliary) are controllable independently of one another.

The machine 1 further comprises an actuating means 20 operatively connected to the plate 11 and configured to place the latter in rotation about the main axis of the container 2. The control unit is electrically connected to the guide 4 and is configured to control the sliding of the main carriage 9a and of the auxiliary carriage 9b on the guide 4 and their reciprocal distance through driving predefined electrical currents along the electrical windings extending along the guide 4. The control unit is further configured for commanding the variation of the reciprocal distance between the main carriage 9a and the auxiliary carriage 9b so as to activate the actuating means 20 as a function of said distance.

Substantially, the sliding on a guide 4 of a main carriage 9a and an auxiliary carriage 9b associated therewith can be controlled by the control unit, which is programmed for the management and variation of their reciprocal distance, for the activation of the actuating means 20 able to rotate a support plate 11 positioned on the main carriage 9a.

Preferably, the guide 4 lies on a lying plane 14 arranged vertically so that the outward stretch 6 and the return stretch 7 are vertically superposed with each other (FIG. 1). In other words, the annular shape of the guide 4 lies on a vertical plane so that the carriages 9 move along an upper or lower outward stretch 6 with respect to the upper or lower return stretch 7. In other words, only one of the two stretches (outward or return) is used for transporting the containers 2.

In the embodiments illustrated in the appended figures, the outward and return stretches are rectilinear, while at the ends of the latter there are curvilinear stretches 8.

The treatment unit 13 for treating the containers 2 is arranged flanked to the guide 4 with respect to said lying plane 14 arranged vertically so as to act on the containers 2 in the feed direction.

In an alternative embodiment, there may be a plurality of treatment units 13 flanked on opposite sides with respect to the guide 4 (e.g. one to the right and one to the left of the guide 4).

In particular, in a first embodiment, there may be two treatment units 13 flanked on opposite sides with respect to the guide 4 at the same position along the guide 4. In this way, it is possible to simultaneously treat two different sides of the same container 2.

In a second embodiment, there may be two treatment units 13 flanked on opposite sides with respect to the guide 4 and distanced along the guide 4. In this way, it is possible to perform two treatments on the same container 2 in sequence.

In any case, the support and/or retaining means 10 preferably extends away from the guide 4 according to a radial direction with respect to the dimensions of the guide 4 itself so as to interact with the containers 2 arranged outside the dimensions of the guide 4. In other words, the support means is arranged outside the dimensions of the guide 4 itself.

Furthermore, each carriage 9 is interposed between respective support and/or retaining means 10 and the guide 4 according to a main axis of a container 2 loaded onto the carriage 9. In other words, each carriage 9 and the respective support means are substantially aligned along a main axis of the transported container 2.

However, in other embodiments not illustrated in the appended figures, the carriage 9 and/or the support and/or retaining means 10 could be separated with respect to a radial distance away from the guide 2, e.g. they could be arranged laterally with respect to the vertical lying plane 14.

Furthermore, as already mentioned, the guide 4 comprises an electromagnetic interaction means (windings in which electrical current flows) positioned consecutively so as to exert an electromagnetic field at an outer attraction surface 15 of the guide 4. Each carriage 9 comprises at least one magnet (preferably a plurality) and the carriage 9 is slidably engaged with the guide 4 at least at said outer attraction surface 15 so as to create a magnetic attraction between the carriage 9 and the base module.

It is to be noted that the guide 4 is interposed between the electromagnetic interaction means and the magnet and is configured for maintaining a predefined reciprocal distance between the two so that the magnetic attraction is as efficient as possible.

The outer attraction surface 15 can be defined by a surface of the guide 2 facing towards the outside according to a radial direction or by a side surface of the guide 2 (parallel to the vertical lying plane 14).

Preferably, said outer attraction surface 15 faces upwards or downwards according to a vertical direction, and said carriages 9 are slidably arranged on said outer attraction surface 15.

In this way, the weight of the container 2 and/or the thrust force of the support and/or retaining means 10 falls directly onto the guide 4 itself so as to promote the resistance to weight.

In practice, the containers 2 are arranged above or below the carriages 9 outside the dimensions of the guide 4.

FIG. 1 shows the preferred embodiment in which the machine 1 comprises two conveyors 3a, 3b superposed along the same vertical plane so as to define an upper conveyor 3b and a lower conveyor 3a between which the containers 2 to be treated are arranged in use. Such conveyors 3a, 3b comprise respective support carriages 9 vertically aligned with each other so as to retain a container 2 between them.

The two conveyors 3a, 3b only face each other along the respective outward stretches 6, whereas the respective return stretches are arranged above and below the outward stretches of the same conveyor 3.

It is to be noted that the carriages 9 of the upper conveyor 3b and the carriages 9 of the lower conveyor 3a are synchronised in movement at least for the outward stretch 6 so as to retain the container 2 in position at least during the passage at the treatment unit 13.

In other words, the control unit is configured to move the carriages 9 of the two conveyors 3 in a synchronised way with each other.

Furthermore, the pressing member 12 of each carriage 9 can be configured between a raised condition and a lowered one for retaining the container 2. The vertical distance between the two conveyors 3 is a function of the height of the containers 2 to be treated and, preferably, is a function of the stroke of the pressing member 12.

The machine 1 can further comprise a means for varying the vertical distance between the two conveyors 3a, 3b interposed between them and configurable between different distance conditions so as to be able to treat containers 2 of different heights. By way of example, such means for varying the distance comprises one or more actuators arranged in different positions and that can be controlled by the control unit.

Furthermore, the machine 1 can comprise a transfer conveyor 17 arranged at the inlet or at the outlet of a conveyor 3 for transferring the containers 2 from an outer conveyor belt 18 towards the guide 4.

In the preferred embodiments illustrated in FIGS. 1 and 2, the transfer conveyor 17 comprises in turn a linear motor.

According to the present invention, the transfer conveyor 17 comprises a guide 18, defining the stator, and a plurality of transfer carriages 19 defining respective linearly movable rotors. It is to be noted that the conveyor 17 according to the present invention may be:

an independent conveyor; or
a transfer conveyor towards a main conveyor 3 of the machine 1;
a machine for treating containers 2 with which a container treatment unit is preferably associated.

Preferably, on board the transfer carriages 19 picking and releasing grippers 21 are mounted that are preferably configured for picking the containers from the outer conveyor 18 and for releasing them on the plate 11 of the main conveyor 3 (in the case of the transfer conveyor illustrated in the appended figures).

Figure 3:
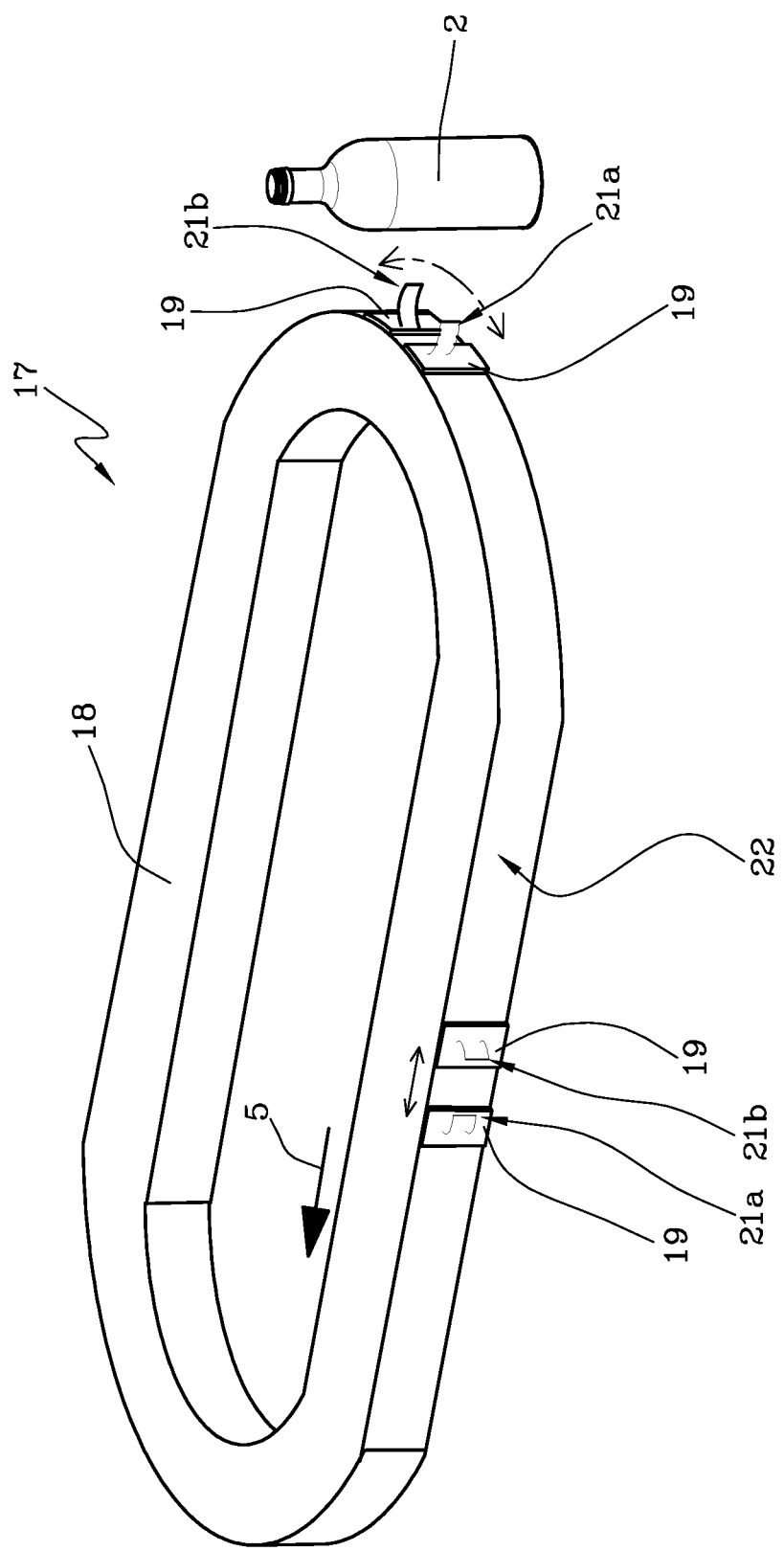
FIG. 3 is a schematic side view of the conveyor according to the present invention.

In the embodiment shown in FIG. 3, each of said grippers 21 comprises two semi-grippers 21a, 21b respectively mounted on different and consecutive carriages 19, wherein the carriages 19 are movable towards each other so as to adjust the reciprocal distance and the picking area of the gripper 21 according to the type of container 2 to be picked (with particular reference to the diameter of the container 2). In practice, the semi-grippers retain the container 2 laterally keeping it suspended and leaving the base and the top free.

It is to be noted that the semi-grippers 21a, 21b are mounted on different and consecutive carriages 19 of the same guide 18 (not of different guides). In detail, the semi-grippers 21a, 21b are mounted on carriages 19 that lie on the same path (same plane).

Furthermore, each semi-gripper 21a, 21b is at least partially interchangeable, with respect to the carriage 19 on which it is mounted, with a respective semi-gripper 21a, 21b or part of it having a different shape and/or outline and/or dimensions as a function of the container 2 to be picked.

In detail, a control unit is configured to move the carriages with the two semi-grippers 21a, 2b on board, towards or away from each other in a pre-adjustment step of the reciprocal distance as a function of the type of container to be treated. Then, the control unit is configured to move the carriages with the two semi-grippers 21a, 21b on board in synchrony maintaining said pre-regulated distance.

It is to be noted that the structure and commands for the transfer conveyor 17 are independent from the structure of the main conveyor 3 used and the transfer conveyor could also be released from the main conveyor 3.

The control unit is operatively connected to the guide 18 and to the carriages 19 and is configured to control the position of the different and consecutive carriages 19 on which respective gripping members 21a, 21b are mounted.

It is also to be noted that the guide 18 of the transfer conveyor 17 extends along an annular path that lies on a horizontal plane.

In the event of the transfer conveyor illustrated in the appended figures, such horizontal plane on which the guide 18 of the transfer conveyor 17 rests is vertically staggered with respect to the main conveyor 3 (with respect to the horizontal plane which lies on the outward stretch 6) so as to promote the interfacing between the two conveyors for the release of the containers. In FIGS. 1 and 2 the transfer conveyor 17 is partially interposed between the lower conveyor 3a and the upper conveyor 3b considering a vertical direction.

In particular, the transfer carriages 19 are arranged at a side (vertical) face 22 of the guide and the grippers 21 extend externally in a cantilever fashion so as to be able to pick and release the containers 2 easily.

Furthermore, the transfer conveyor 17 is synchronised with the main conveyor 3 so that the transfer carriages 19 release each container 2 in a position corresponding to that of a respective carriage 9 of the main conveyor 3 when it reaches a kind of transfer zone.

In the event of a conveyor used in a machine for treating containers 2, there is a container treatment unit arranged along said guide for performing a treatment on a container 2 in transit.

In detail, the treatment unit (preferably a labelling machine) for treating the containers 2 is configured to perform a treatment (labelling) on the base and/or the top of the container 2 itself retained laterally by the grippers 21a, 21b.

The subject matter of the present invention is also a method for conveying or treating the containers 2 that descends directly from the above indications that is referred to herein below.

In particular, the method comprises a step of picking a container 2 (e.g. from a conveyor belt) which comprises the following sub-steps:
  pre-positioning (in the stationary state) of a first carriage 19 on which a semi-gripper 21a is mounted upstream of the container according to the feed direction 5,
  waiting for a respective container 2 to reach such semi-gripper 21a by returning into the picking area,
  subsequent nearing of the carriage 19 on which the other semi-gripper 21b is mounted, to regulate the reciprocal distance between them, and movement of the first carriage 19 towards the second 19 for picking the container 2;
  movement of both carriages 19 to the same distance and retaining the container 2.

The method further comprises a step of releasing the container 2 (e.g. on a conveyor belt or a carousel or another conveyor) which comprises the following sub-steps:
  distancing a first carriage 19 on which a semi-gripper 21a is mounted with respect to the container 2 to be released by increasing the speed with respect to the container 2,
  waiting for the container 2 to leave the picking area of the other semi-gripper 21b,
  following the waiting step, moving the second carriage 19 on which the other semi-gripper 21b is mounted towards the first carriage 19.

The present invention attains the set results.

In particular, the present invention allows the containers to be retained laterally leaving the base and the top free for a treatment (e.g. labelling) of the container itself. Such retaining performed through movable magnetic carriages can advantageously be performed in a variable way as a function of the characteristics of the entire conveying system and the characteristics of the actual container to be picked.

Furthermore, the orientation according to a vertical plane of one or more conveyors allows the dimensions to be reduced according to a horizontal direction of each of them or, better, to transfer such dimensions in the vertical sense where there are normally no restrictions.

In this way, the operator has more maneuvering space around the machine and the space for installing any further treatment units.

Furthermore, as the present invention is adapted to be used as a linear conveyor, the resulting advantages that it achieves with respect to a known linear conveyor, are substantially connected with the fact that the carriages on which the containers are housed can be controlled independently from the point of view of position, speed and reciprocal acceleration. Furthermore, according to the present invention, a rotating plate can be mounted on each carriage, rotatable by command during the feed of the bottles as a function of the work requirements.

The invention claimed is:

1. A machine for treating or conveying containers, comprising:
  at least one conveyor for conveying the containers, the at least one conveyor comprising:
  a guide extending along a feed direction for feeding containers with a substantially annular shape so as to define an outward stretch and a return stretch;
  a treatment unit for treating containers arranged along said guide for performing a treatment on a container in transit;
    a plurality of carriages for supporting the containers slidably mounted on a same guide consecutively to each other; said guide and each carriage defining together respective linear motors;
  each support carriage comprising at least a part of respective gripping means of a respective container wherein said gripping means is configured to interact with a respective container to be treated;
  wherein each of said gripping means comprises two gripping members respectively mounted on different and consecutive carriages along the same guide; said carriages being movable towards or away from each other so as to regulate the reciprocal distance along the feed direction of the containers and define a picking area of the gripping means defined between them as a function of the type of container to be picked or released;
    said machine for treating or conveying containers is configured to convey the containers leaving a top and a base of the container free for treatment; and
    said treatment unit for treating the containers is configured to perform a treatment on the base and/or the top of the container itself retained laterally by the grippers.

2. The machine according to claim 1 wherein said gripping means comprises picking grippers and each gripping member comprises a semi-gripper.

3. The machine according to claim 2 wherein said semi-grippers are configured to retain the container laterally keeping it suspended and leaving the base and the top free.

4. The machine according to claim 2 wherein each semi-gripper is at least partially interchangeable with a respective semi-gripper or part of it having a different shape and/or outline and/or dimensions as a function of the container to be picked.

5. The machine according to claim 1 wherein it comprises a control unit operatively connected to the guide and to the carriages and being configured to control the position of the different and consecutive carriages on which respective gripping members are mounted.

6. The machine according to claim 1 wherein said guide is oriented according to a horizontal plane.

7. The machine according to claim 1, wherein the treatment unit is configured for treating containers arranged along said guide for performing an active treatment by contact on the container in transit.

8. The machine according to claim 1, wherein said gripping means has at least one of a shape and dimension that is at least in part counter-shaped to the container to be picked.

9. A method for conveying or treating containers, comprising the following operating steps:
providing a conveyor for conveying containers comprising a guide extending along a feed direction for feeding containers with a substantially annular shape so as to define an outward stretch and a return stretch;
providing a treatment unit for treating containers arranged along said guide for performing a treatment on a container in transit;
providing a plurality of carriages for supporting the containers slidably mounted on a same guide consecutively to each other; said guide and each carriage defining together respective linear motors;
providing at least a part of the gripping means for picking a container on each carriage so as to interact with a respective container to be treated;
wherein two gripping members are provided for each of said gripping means respectively mounted on different and consecutive carriages along the same guide; the method envisages moving the carriages towards or away from each other so as to regulate the reciprocal distance along the feed direction and define a picking area of the gripping means as a function of the type of container to be picked and released;
said machine for treating or conveying containers is configured to convey the containers leaving a top and a base of the container free for treatment; and
said treatment unit for treating the containers is configured to perform a treatment on the base and/or the top of the container itself retained laterally by the grippers.

10. The method according to claim 9 wherein said gripping means comprises picking grippers and each gripping member comprises a semi-gripper.

11. The method according to claim 10 wherein said semi-grippers are configured to retain the container laterally keeping it suspended and leaving the base and the top free.

12. The method according to claim 9 further comprising picking a container that comprises:
pre-positioning a first carriage on which a gripping member is mounted,
waiting for a respective container to reach such gripping member;
nearing a second carriage on which the other gripping member is mounted to regulate the reciprocal distance between the gripping members and pick a container;
maintaining the reciprocal distance between the gripping members for retaining the container.

13. The method according to claim 9 further comprising a step of releasing the container that comprises:
distancing a first carriage on which a gripping member is mounted with respect to the container to be released,
waiting for the container to leave the picking area;
following the waiting step, moving the second carriage on which the other gripping member is mounted.

14. The method according to claim 9, further comprising a step of interchanging the picking grippers that are part of the gripping means as a function of the container to be picked.

15. The method according to claim 9, further comprising a step of performing a treatment on the lower base and/or top of the container after picking the container itself.

16. The method according to claim 9, wherein the treatment unit is configured for treating containers arranged along said guide for performing an active treatment by contact on the container in transit.

17. The method according to claim 9, wherein said gripping means has at least one of a shape and dimension that is at least in part counter-shaped to the container to be picked.

* * * * *